United States Patent

Ishikawa et al.

[11] Patent Number: 5,446,820
[45] Date of Patent: Aug. 29, 1995

[54] MODE FIELD DIAMETER CONVERSION OPTICAL FIBER

[75] Inventors: Shinji Ishikawa; Hiroo Kanamori; Koji Nakazato; Masayuki Nishimura; Yuichi Ohga, all of Yokohama, Japan

[73] Assignee: Sumitomo Electric Industries, Ltd., Osaka, Japan

[21] Appl. No.: 98,908

[22] Filed: Jul. 29, 1993

[30] Foreign Application Priority Data

Jul. 29, 1992 [JP] Japan ................. 4-202407

[51] Int. Cl.$^6$ ............................... G02B 6/10
[52] U.S. Cl. ..................... 385/123; 385/50; 385/124; 385/125; 65/385
[58] Field of Search ............ 385/123, 124–128, 385/96, 27, 24, 142, 43, 50; 372/6; 427/163; 359/124; 307/3; 65/3.12, 13, 18.2, 435, 385

[56] References Cited

U.S. PATENT DOCUMENTS

| | | | |
|---|---|---|---|
| 4,413,882 | 11/1983 | Bailey et al. | 385/123 |
| 4,669,821 | 6/1987 | Blair et al. | 385/142 |
| 4,784,465 | 11/1988 | Berkey | 385/123 X |
| 4,978,201 | 12/1990 | Yamada et al. | 385/96 |
| 5,216,728 | 6/1993 | Charlton et al. | 385/27 |

FOREIGN PATENT DOCUMENTS 0447700 9/1991 European Pat. Off. .

OTHER PUBLICATIONS

Patent Abstracts of Japan, vol. 14, No. 372 (P-1091) 10 Aug. 1990 & JP-A-02 139 504 (Fujikura Ltd.) 29 May 1990.

Hanafusa et al, "Termally-Diffused Expanded Core Fibers for Low-Loss and Inexpensive Photonic Components", Electronics Letters, vol. 27, No. 21, 10 Oct. 1991, pp. 1968–1969.

*Primary Examiner*—Frank Gonzalez
*Assistant Examiner*—Phan Thi Heartney
*Attorney, Agent, or Firm*—Cushman Darby & Cushman

[57] ABSTRACT

An object of this invention is to provide a mode field diameter conversion optical fiber which can be processed in a short period of time to have a reduced mode field diameter at a desired portion thereof. The optical fiber according to this invention comprises a core of silica glass having a residual tensile stress, and a cladding surrounding the core and having a lower refractive index than that of the core. The desired portion is heated to relax the residual tensile stress in the core, whereby the optical fiber has a reduced mode field diameter at the desired portion.

12 Claims, 8 Drawing Sheets

MODE FIELD DIAMETER CONVERSION OPTICAL FIBER

BACKGROUND OF THE INVENTION

1. Field of the Invention

This invention relates to an optical fiber whose mode field diameter can be reduced at a desired portion, a method for fabricating the same, a mode field diameter conversion optical fiber using the optical fiber, and a method for converting a mode field diameter of the mode field diameter conversion optical fiber.

1. Related Background Art

Figure 1A:
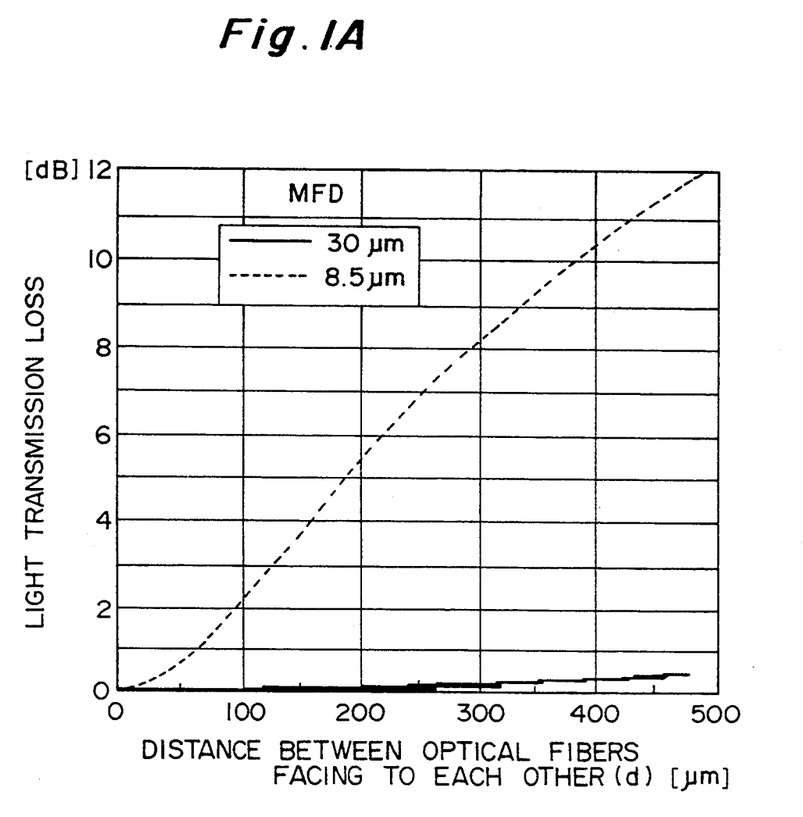
FIG. 1A is a graph of light transmission losses corresponding to a distance between optical fiber ends opposing each other.
Figure 1B:
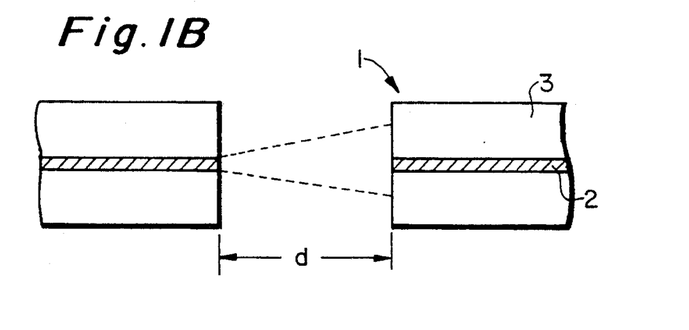
FIG. 1B is an explanatory view of a distance between optical fiber ends opposing each other.

A problem involved in inserting optical parts between optical fiber ends which oppose each other is that a gap is formed between the optical fibers. The size of the gap corresponds to a thickness of the optical parts. The presence of this gap acts to decrease light transmittance. The amount of decrease in light transmittance depends on the size of the gap, that is, a distance between the optical fiber ends opposing each other, and a mode field diameter of the optical fiber 1. This is shown in FIGS. 1A and 1B. The relationship between the light transmittance, the distance between optical fiber ends opposing each other, and the mode field diameter is expressed by Formula 1.

$$T = 1/[1 + a(\lambda d/w^2)^2] \quad (1)$$

where
- T: a light transmittance
- a: a constant determined by an optical fiber
- $\lambda$: a wavelength of transmission light
- d: a distance between optical fiber ends opposing each other
- w: a mode field diameter of the optical fiber As apparent from Formula 1, in a transmission unit using light of a specific wavelength, to decrease the light transmission loss caused by the distance between opposing optical fiber ends, it is preferable that the mode field diameter of both optical fibers at their opposing ends be large. In long-distance transmission using single-mode optical fibers, however, it is preferable that their mode field diameter be small in view of light losses due to their bends, twists, etc.

The following two methods are proposed for inserting optical parts between optical fibers and suppressing the decrease of light transmittance.

a) A small-mode field diameter optical fiber is formed, and the mode field diameter is expanded at a portion of the optical fiber. The optical fiber is divided at the portion of the expanded mode field diameter, and optical parts are inserted between the divided optical fibers. Optical fibers for long-distance transmission uses are connected to the divided optical fibers at the end faces other than the divided end faces.

b) An optical fiber of a large-mode field diameter is formed, and the mode field diameter is reduced at both ends of the optical fiber. The optical fiber is divided at the portion of the large mode field diameter, and optical parts are inserted between the divided optical fibers opposing each other. Optical fibers for long-distance transmission uses are connected to the divided optical fibers at the end faces of the reduced mode field diameter.

The method (a) has been conventionally used because of its practicality. Specifically, to convert a mode field diameter, the following two methods have been practiced.

Figure 2:
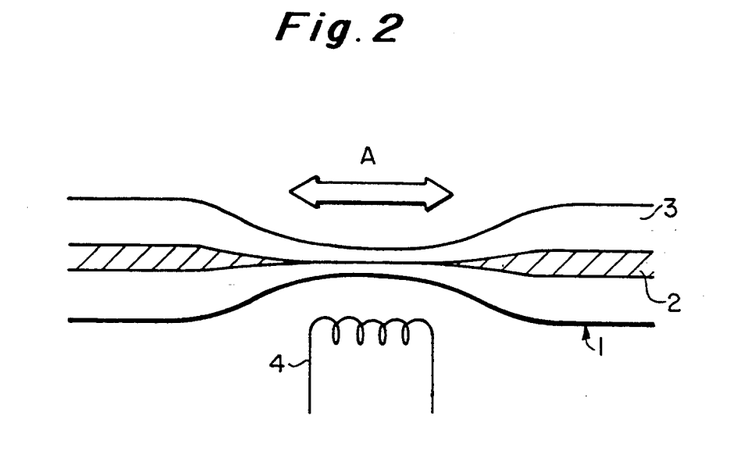
FIG. 2 is an explanatory view of an elongation method of the conventional methods for converting a mode field diameter of an optical fiber.

1) A portion of an optical fiber is heated by a heater 4 or other heating means and elongated by applying tension along arrow A to reduce a core diameter, whereby its mode field diameter is increased (FIG. 2).

Figure 3:
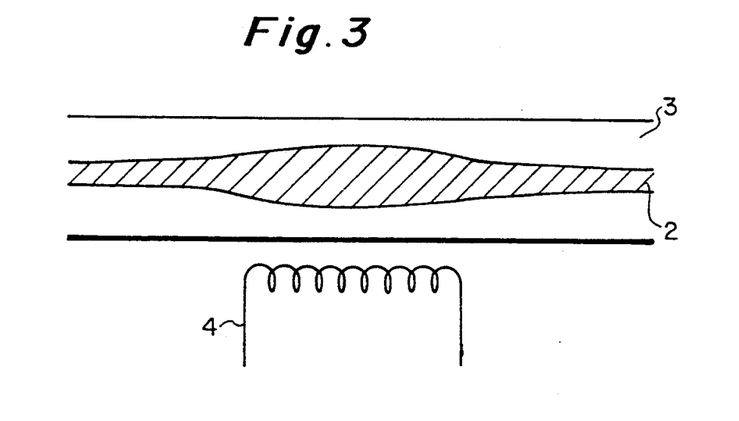
FIG. 3 is an explanatory view of a dopant diffusion method of the conventional methods for converting a mode field diameter of an optical fiber.

2) A portion of an optical fiber is heated to thermally diffuse a dopant added to the core for improving its refractive index so as to effectively lower a refractive index difference between the core 2 and the cladding 3, whereby a mode field diameter is expanded (FIG. 3).

In the method (1), since optical fibers having an outer diameter as small as 125 $\mu$m (CCITT Standards) are elongated, mode field diameters can be expanded only over regions of short lengths. The regions of short lengths can accommodate only a small number of optical parts, but cannot accommodate a large number of optical parts. The method (2) can solve the problem of obtaining lengthy regions of expanded mode field diameters by increasing heating regions. But the method (2) requires a longer heating time (some hours), which results in problems of low productivity and deformation of optical fibers.

SUMMARY OF THE INVENTION

This invention overcomes the above-described problems and provides a mode field diameter conversion optical fiber which can be processed in a short period of time for the reduction of mode field diameters at desired portions.

Figure 4:
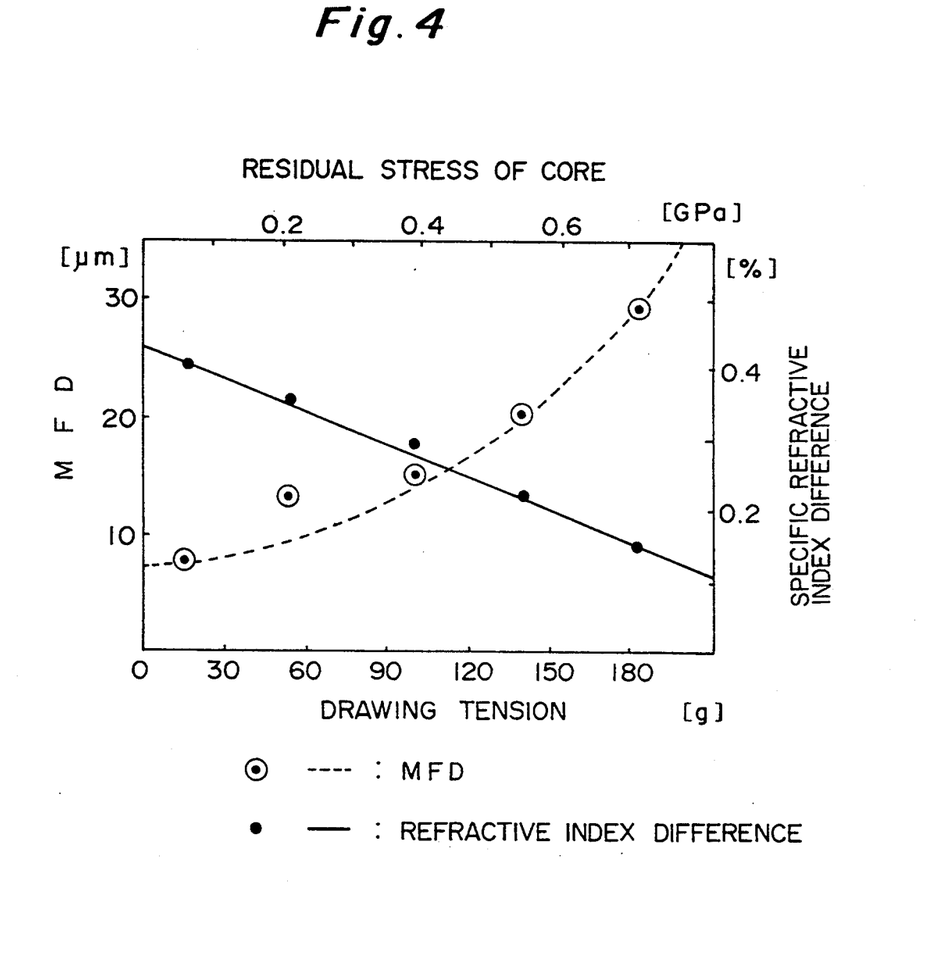
FIG. 4 is a graph of relationships among drawing tensions (residual tensile stresses of a core), mode field diameters (MFDs) and refractive index differences.

Before this invention is described, the principle this invention is based on will be explained. In drawing an optical fiber preform to an optical fiber, when the core has a higher viscosity than the cladding, a tensile stress due to a drawing tension is generated concentratively in the core, and after the drawing, the stress remains in the core. The residual tensile stress lowers a refractive index of the core. A heating treatment relaxes the residual tensile stress. A change in the refractive index of glass due to a residual tensile force is expressed by the following Formula 2

$$\Delta n = C \cdot \sigma \quad (2)$$

where
- $\Delta n$: change in the refractive index
- C: photoelasticity constant determined by composition of glass
- $\sigma$: residual tensile stress It is seen from Formula 2 that $\sigma$ is required that $\sigma \geq 0.12$ GPa to convert a mode field diameter effectively because in silica glass-based optical fibers, a mode field diameter conversion is effective at a refractive index change above $0.05 \times 10^{-2}$, and silica glass-based optical fibers has C=about $-4.2 \times 10^{-12}$ Pa$^{-1}$. FIG. 4 shows relationships among drawing tensions, specific refractive index differences and mode field diameters. The particular optical fiber considered in relation to FIG. 4 had a core material of silica (SiO$_2$), a cladding material (F-SiO$_2$), and a specific refractive index difference of preform of 0.45%. Residual tensile stress values of an optical fiber can be measured by photoelasticity CT method described in T. Abe, Y. Mitunaga and H. Koga: "Photo-elastic computer tomography: a novel measurement method for axial residual stress profile in optical fibers" J. Opt. Soc. Am., A3, pp. 133–137 (1986).

Figure 5:
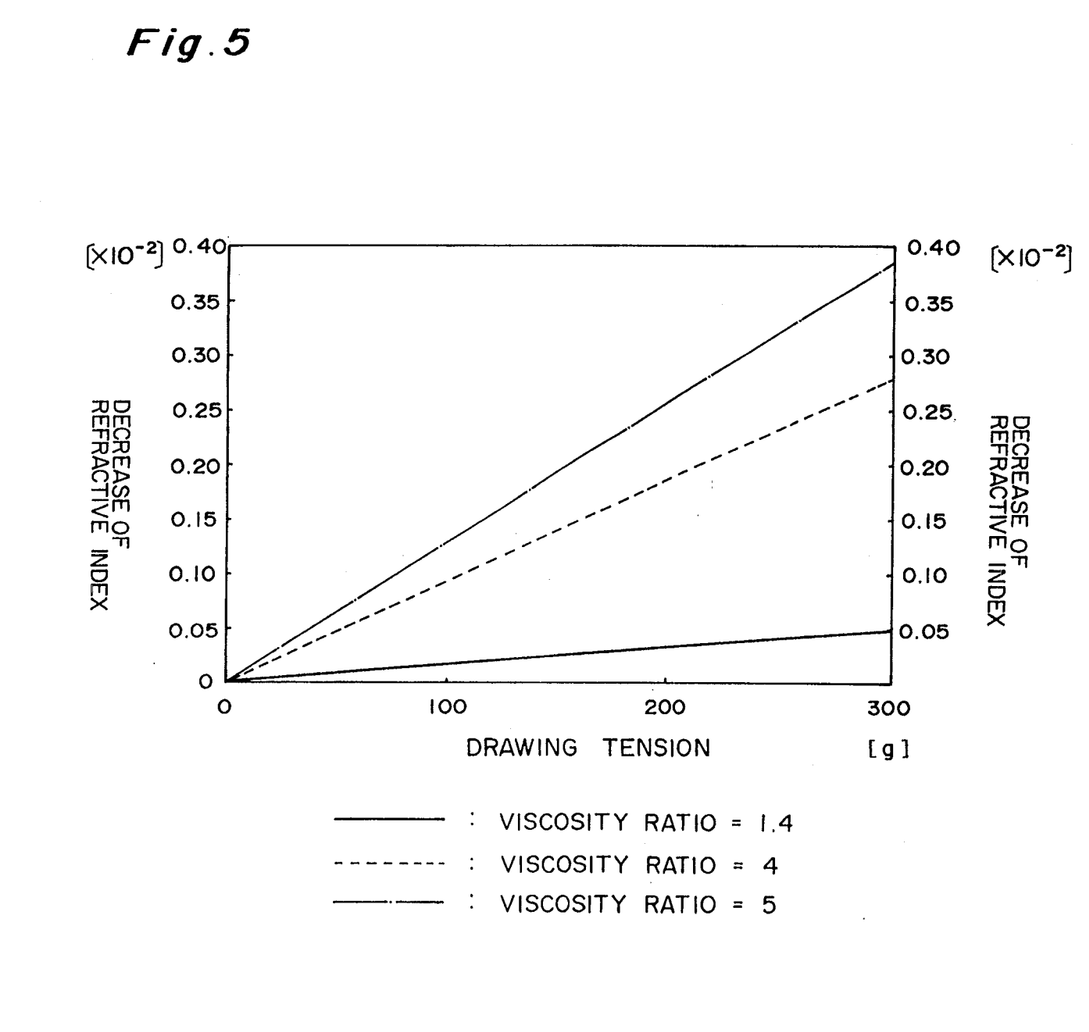
FIG. 5 is a graph of relationships between drawing tensions, and refractive index decreases of the core.

The relationship between drawing tensions and refractive index decreases of a core)of an optical fiber depends on viscosity ratios between the core thereof and the cladding thereof (core/cladding) when the optical fiber is drawn. FIG. 5 is a graph in which for viscosity ratios of 1.4, 4 and 5, drawing tensions are taken on the horizontal axis, and refractive index decreases are taken on the vertical axis. The particular optical fiber considered in relation to FIG. 5 had a core material of silica ($SiO_2$) a cladding material ($F-SiO_2$). As shown in this graph, it is at a viscosity of 1.4 that a $0.05 \times 10^{-2}$ refractive index decrease takes place at a 300 g drawing tension. But usually drawing without cutting is difficult at a drawing tension above 300 g. Furthermore, when such drawing is successfully accomplished, the fabricated optical fiber usually will possess insufficient. Accordingly, it is preferable that the optical fiber according to this invention has a viscosity ratio above 1.4.

Figure 6:
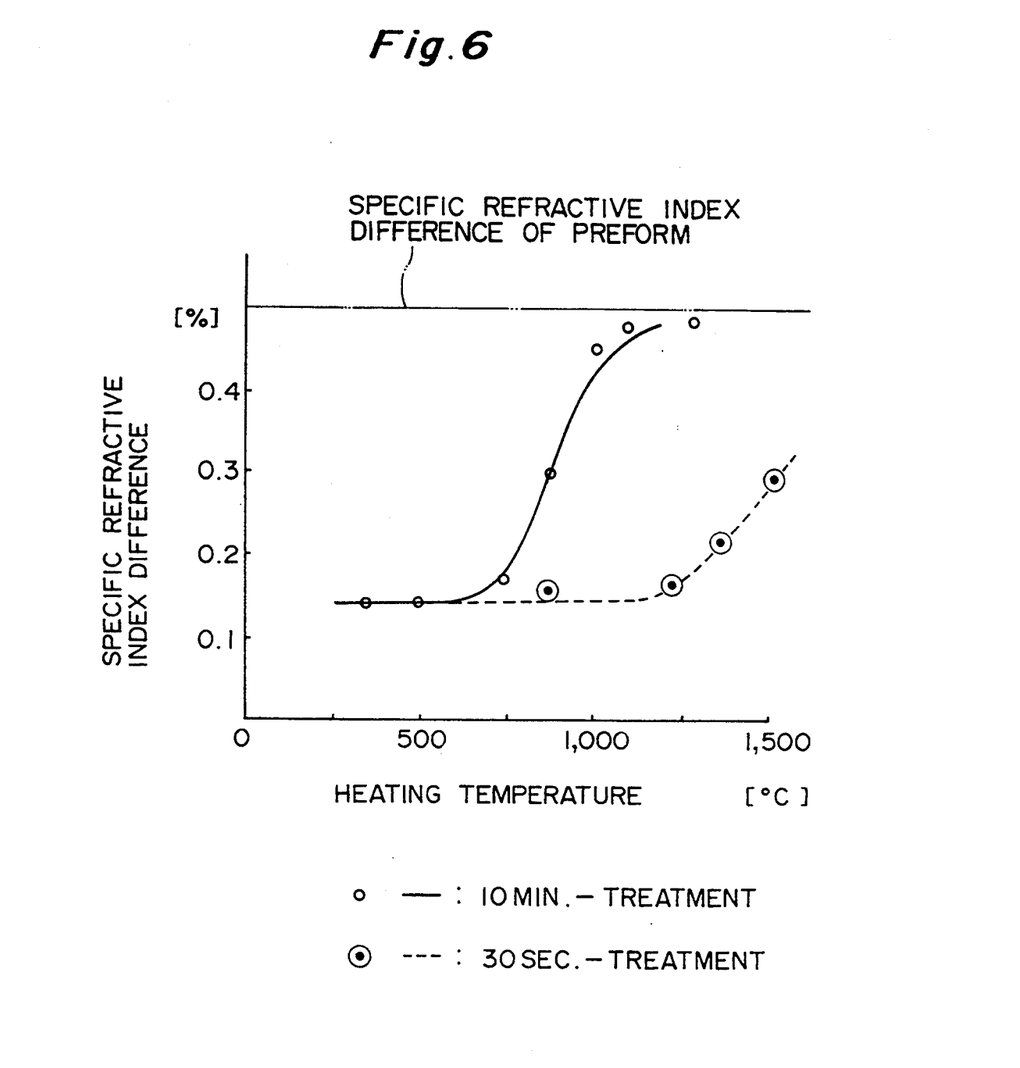
FIG. 6 is a graph of relationships between recovery of refractive index difference and heating treatment conditions.

The residual tensile stress of the core is relaxed by heating treatment. An example of relationships among heating temperatures, periods of heating time and relaxation amounts of silica glass-based optical fiber in the heating treatment is shown in FIG. 6. The particular optical fiber considered in relation to FIG. 6 had a core material of silica ($SiO_2$), a cladding material ($F-SiO_2$), and a specific refractive index difference of preform of 0.45%. In FIG. 6, for 10 minute-heating and 30 second-heating, heating temperatures are set forth on the horizontal axis, and relaxation amounts are set forth on the vertical axis. As in this graph, relaxation of a residual tensile stress of a silica glass-based optical fiber starts at a heating temperature above about 600° C. It is seen that as the heating temperature rises, the speed of relaxation of the residual tensile stress increases.

What has to be noted in converting mode field diameter is that an abrupt change of the mode field diameter results in a larger amount of transmission light being changed into radiation, and the optical fiber having larger transmission losses. To avoid abrupt changes of a mode field diameter of the optical fiber for the decrease transmission losses, it is preferable that a heating region is not too small. It is empirically preferable that a heating region is above about 0.5 mm.

This invention is based on the above-described principle and uses the above-described method (b). Furthermore, this invention is characterized in that an optical fiber of a large mode field diameter is formed, and a desired portion thereof is heated to reduce the mode field diameter at the desired portion.

This invention specifically relates to an optical fiber comprising a core for optical transmission and a cladding surrounding the core and having a lower refractive index than that of the core. A residual tensile stress remains in the core and when a desired portion of the optical fiber is heated, the residual tensile stress at the desired portion is relaxed to increase refractive index difference between the core and the cladding at the desired portion by above $0.05 \times 10^{-2}$. The residual tensile stress of the core after the drawing is above 0.12 GPa.

The core may be formed of highly pure silica glass substantially containing no impurities, or silica glass containing at least one of fluorine, chlorine, boron oxide, phosphorus pentaoxide and germanium oxide, and the cladding may be formed of highly pure silica glass Substantially containing no impurities, or silica glass containing at least one of fluorine, chlorine, boron oxide, phosphorus pentaoxide and germanium oxide.

A viscosity ratio between the core and the cladding (core/cladding) may be above 1.4 at the time of drawing.

The mode field diameter conversion optical fiber according to this invention comprises the above-described optical fiber having a mode field diameter at a desired portion thereof reduced by heating.

The method for converting a mode field diameter of an optical fiber comprises heating a desired portion of the above-described optical fiber to reduce a mode field diameter of the optical fiber at the desired portion.

The desired portion of the optical fiber may be heated by a heater, a discharge electrode or a burner.

A heated region of the optical fiber may have a length above about 0.5 mm.

A residual tensile stress of a desired portion of the above-described optical fiber can be released by a short time of heating. A residual tensile stress of the core lowers a refractive index thereof. When a residual stress is above 0.12 GPa, the mode field diameter at the desired portion is effectively reduced. Thus the heating partially or completely releases a residual stress, and a refractive index of the core is increased, resultantly with a higher refractive index difference from the cladding. Thus, a mode field diameter conversion optical fiber having a mode field diameter reduced at a desired portion can be prepared. Such mode field diameter conversion optical fiber functions not only simply as optical transmission passages, but also as optical devices for converting mode field diameters with small losses.

The present invention will become more fully understood from the detailed description given hereinbelow and the accompanying drawings which are given by way of illustration only, and thus are not to be considered as limiting the present invention.

Further, the scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF PREFERRED EMBODIMENTS

Preferred embodiments of this invention will be explained with reference to the drawings.

First Embodiment

Figure 7:
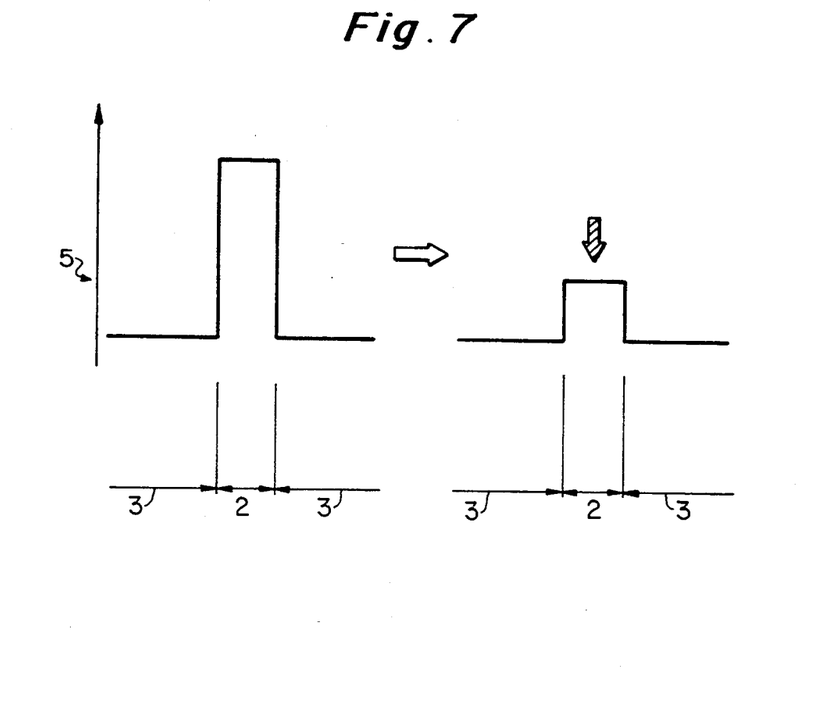
FIG. 7 is a view of changes of a residual tensile stress distribution before and after the heating of the optical fiber according to embodiments of this invention.
Figure 8:
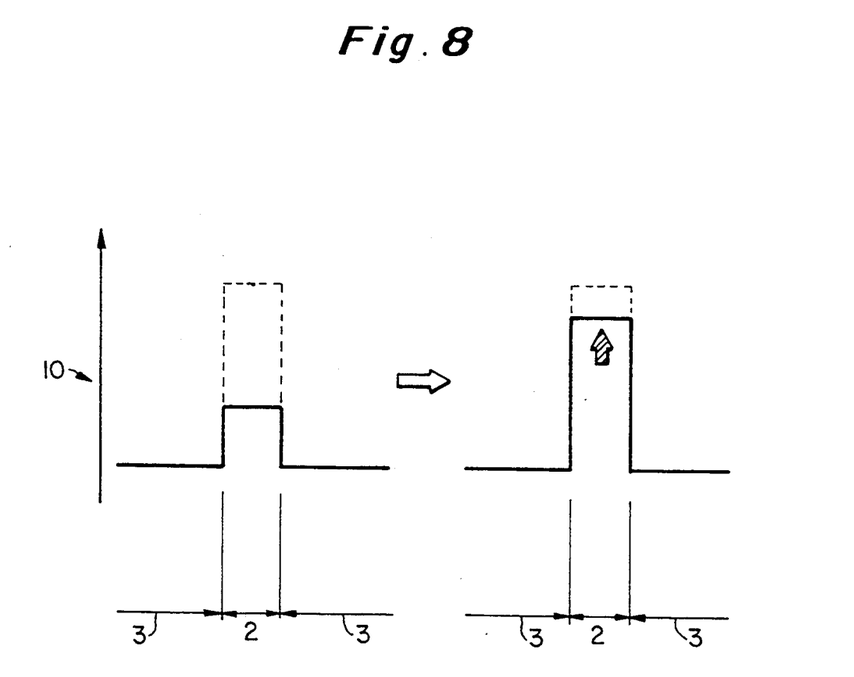
FIG. 8 is a view of changes of refractive index distribution before and after the heating of the optical fiber according to the embodiments.

FIGS. 7 and 8 are schematic views of the optical fiber according to this embodiment. FIG. 7 shows a distribution change of the residual tensile stress 5, and FIG. 8 shows a distribution change of the refractive index 10 before and after the heating treatment for the mode field diameter conversion.

In FIGS. 7 and 8, the optical fiber before the heating treatment is a single mode fiber formed by the known rod in tube method. First, a columnar preform of silica glass for the core was formed. Then, a cylindrical preform of F-added silica glass for the cladding was formed. Next, the core preform was inserted into the hollow portion of the cladding preform, and heated and drawn for integration at about 1900° C. and at a drawing tension=150 g. Thus an optical fiber (outer diameter: 125 $\mu$m) with a residual tensile stress for the mode field diameter conversion was prepared. This optical fiber had a specific refractive index difference of 0.45% between the preform core and the preform cladding. The drawing viscosity ratio was about 7. The thus-prepared optical fiber was measured on the mode field diameter, and the measured mode field diameter was 27 $\mu$m (wavelength of transmission light: 1.55 $\mu$m).

Figure 9:
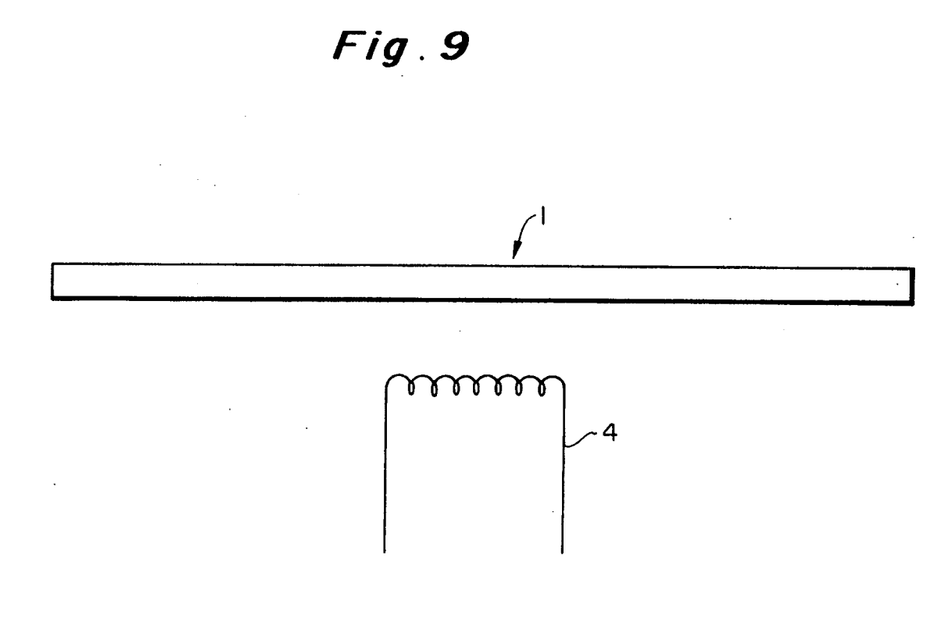
FIG. 9 is a view of a heating treatment for converting mode field diameter by a heater.
Figure 10:
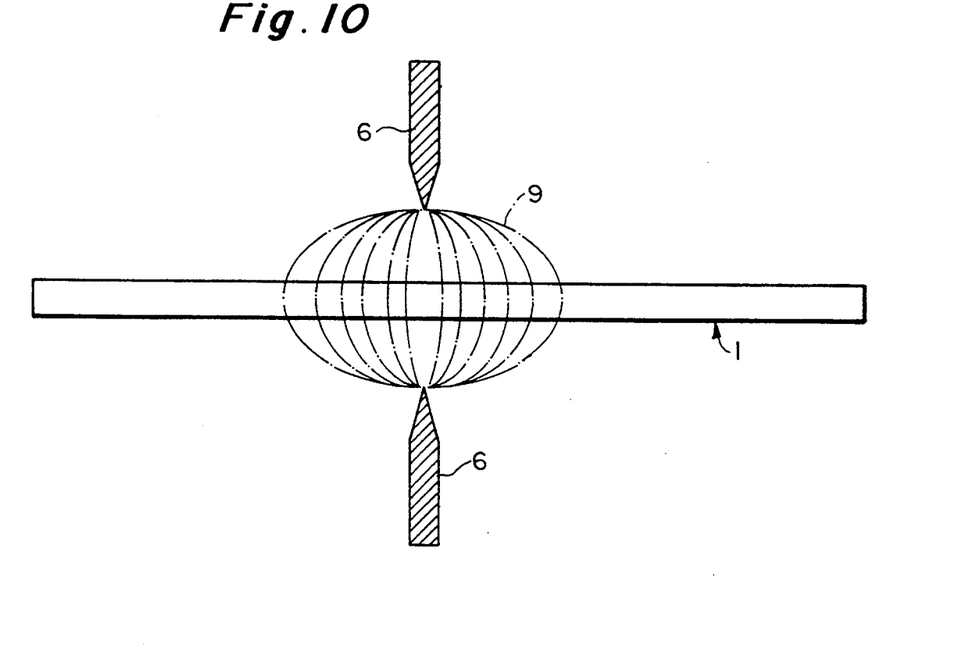
FIG. 10 is a view of a heating treatment for converting mode field diameter by a discharge electrode.
Figure 11:
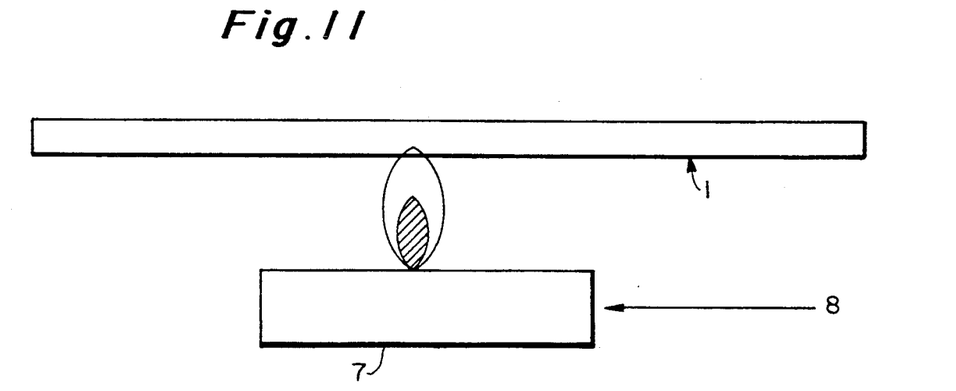
FIG. 11 is a view of a heating treatment for converting mode field diameter by a burner.

As seen on the left side of FIG. 7, the optical fiber before the heating treatment has a residual tensile stress in the core region. As seen on the left side of FIG. 8, a refractive index of the core region is lower than that of the preform core region, due to the effect of the residual tensile stress. This optical fiber was subjected to the heating treatment for 10 minutes at 1000° C. For example, a heater 4 (FIG. 9), a discharge electrode 6 (FIG. 10) emitting discharge 9, and a burner 7 (FIG. 11) provided with a gas feed 8 (e.g., $O_2$, $H_2$, $C_3H_8$, etc.) may be used as heating means. Then the stress is relaxed as seen on the right side of FIG. 7. As a result, as seen on the right side of FIG. 8, the core regions has the improved refractive index. Accordingly, a refractive index difference between the core and the cladding becomes higher, and the mode field diameter becomes smaller. The mode field diameter of the heat-treated portion after the heating treatment was measured, and the measured mode field diameter was 9.5 $\mu$m (wavelength of transmission light: 1.55 $\mu$m).

A long-distance transmission optical fiber (mode field diameter: 8.5 $\mu$m) was fused onto the reduced mode filed diameter portion, and a coupling loss was measured. The measured coupling loss was as good as 0.1 dB.

Second Embodiment

The second embodiment is substantially the same as the first embodiment, differing from the latter only in the heating treatment conditions. That is, the same optical fiber was prepared and was subjected to the heating treatment for 30 seconds at 1850° C. This heating treatment reduced the mode field diameter as in the first embodiment. The measured mode field diameter was reduced to 10 $\mu$m (wavelength of transmission light: 1.55 $\mu$m).

The thus-formed mode field diameter optical conversion fibers according to this invention can find various applications which require reduced mode field diameters. For example, they can be coupled, with small transmission losses, to optical parts (light waveguide devices, optical fibers, etc.) of small mode field diameters. The thus-formed mode field diameter conversion optical fiber can have a mode field diameter reduced not only at the ends thereof, but also at desired optional portions intermediate the ends. In such a case, even when the optical fiber is largely bent at the reduced-mode field diameter portion, the advantageous effect of this invention, such as small losses, can be expected.

This invention has been explained by means of the embodiments but covers other variations. For example, the mode field diameter conversion optical fiber according to this invention can be formed by various forming methods, such as MCVD, OVD, double crucible method, etc. Formation of the core and the cladding of the optical fiber is not restricted to the formation of the embodiment, and the core may be formed of highly pure silica glass substantially containing no impurities, or silica glass containing at least one of fluorine, chlorine, boron oxide, phosphorus pentaoxide and germanium oxide; the cladding may be formed of highly pure silica glass substantially containing no impurities, or silica glass containing at least one of fluorine, chlorine, boron oxide, phosphorus pentaoxide and germanium oxide. Whether the $\mu$mode field diameter conversion optical fiber according to this invention is a single mode fiber or a multi-mode fiber, the same effects can be attained in some cases.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is

1. An optical fiber comprising:
   a core for optical transmission having a drawing induced tensile stress; and
   a cladding surrounding the core and having a lower refractive index than that of the core;
   wherein a desired portion of the optical fiber is heated for relaxing the residual tensile stress at the desired portion and increasing a refractive index difference between the core and the cladding at the desired portion above $0.05 \times 10^{-2}$.

2. An optical fiber according to claim 1, wherein the core is formed of highly pure silica glass substantially containing no impurities, or silica glass containing at least one of fluorine, chlorine, boron oxide, phosphorus pentaoxide and germanium oxide; the cladding is formed of highly pure silica glass substantially containing no impurities, or silica glass containing at least one of fluorine, chlorine, boron oxide, phosphorus pentaoxide and germanium oxide.

3. An optical fiber according to claim 2, wherein at the time of drawing a viscosity of the core is higher than that of the cladding.

4. An optical fiber according to claim 2, wherein at the time of drawing a viscosity ratio between the core and the cladding is above 1.4.

5. An optical fiber according to claim 1, wherein the core is formed of silica glass substantially containing no impurities.

6. An optical fiber according to claim 1, wherein the cladding is formed of fluorine-containing silica glass.

7. An optical fiber according to claim 1, wherein the core is formed of highly pure silica glass substantially containing no impurities, and the cladding is formed of fluorine-containing silica glass.

8. An optical fiber according to claim 7, wherein at the time of drawing a viscosity of the core is higher than that of the cladding.

9. An optical fiber according to claim 7, wherein at the time of drawing a viscosity ratio between the core and the cladding is above 1.4.

10. A method for changing a mode field diameter of an optical fiber, the optical fiber comprising:

a core for optical transmission having a drawing induced residual tensile stress; and a cladding surrounding the core and having a lower refractive index than that of the core;

the method comprising the Step of heating a desired portion of an optical fiber to reduce the mode field diameter at the desired portion the heating relaxing the residual tensile stress at the desired portion and thereby increases a refractive index difference between the core and the cladding at the desired portion above $0.05 \times 10^{-2}$.

11. A method for converting a mode field diameter of an optical fiber according to claim 10, wherein the desired portion of the optical fiber is heated at a temperature above about 600° C.

12. A method for converting a mode field diameter of an optical fiber according to claim 10, wherein a heated region of the optical fiber has a length above about 0.5 mm.

* * * * *